United States Patent
Park et al.

(10) Patent No.: US 9,244,490 B2
(45) Date of Patent: Jan. 26, 2016

(54) MOBILE TERMINAL

(71) Applicant: LG ELECTRONICS INC., Seoul (KR)

(72) Inventors: Jinuk Park, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 13/667,636

(22) Filed: Nov. 2, 2012

(65) Prior Publication Data
US 2013/0113706 A1 May 9, 2013

(30) Foreign Application Priority Data
Nov. 3, 2011 (KR) .......... 10-2011-0113829

(51) Int. Cl.
*G06F 3/02* (2006.01)
*G06F 1/16* (2006.01)
*H04M 1/23* (2006.01)
*H04M 1/22* (2006.01)

(52) U.S. Cl.
CPC ............ *G06F 1/1626* (2013.01); *G06F 1/1662* (2013.01); *G06F 3/0202* (2013.01); *H04M 1/23* (2013.01); *H04M 1/22* (2013.01); *H04M 2250/22* (2013.01); *H04M 2250/52* (2013.01)

(58) Field of Classification Search
CPC ... H04M 1/0206; G02B 26/02; G02B 26/004; G02B 26/00
USPC .......... 345/32, 102, 168–179; 362/97.1–97.4, 362/632–634; 379/428.01–428.04
See application file for complete search history.

(56) References Cited

U.S. PATENT DOCUMENTS

| | | | |
|---|---|---|---|
| 2003/0218702 A1* | 11/2003 | Kwon et al. | 349/65 |
| 2007/0039809 A1* | 2/2007 | Aihara et al. | 200/310 |
| 2008/0019115 A1* | 1/2008 | Park et al. | 362/29 |
| 2008/0230283 A1* | 9/2008 | Yoon et al. | 178/18.11 |
| 2009/0185097 A1* | 7/2009 | Kim et al. | 349/58 |
| 2010/0075720 A1* | 3/2010 | Lee et al. | 455/566 |
| 2010/0182541 A1* | 7/2010 | Ouchi et al. | 349/65 |
| 2010/0302135 A1* | 12/2010 | Larson et al. | 345/102 |
| 2012/0020045 A1* | 1/2012 | Tanase | 361/807 |
| 2013/0021297 A1* | 1/2013 | Lee | 345/175 |

* cited by examiner

*Primary Examiner* — Michael Pervan
*Assistant Examiner* — Andrew Lee
(74) *Attorney, Agent, or Firm* — Birch, Stewart, Kolasch & Birch, LLP

(57) ABSTRACT

A mobile terminal including a case; a touch key mounted in a predetermined portion of the case and configured to generate touch type input data; a light source arranged on a back side of the touch key and configured to emit light; and a light diffusion unit configured to diffuse the light emitted from the light source and provide a backlight to the touch key. Further, the light diffusion unit includes a light guide part configured to guide the light emitted by the light source; an air gap arranged on the light guide part and configured to diffuse the light provided from the light guide part; and a diffuser arranged on the air gap and configured to diffuse the light provided from the air gap towards the touch key.

20 Claims, 12 Drawing Sheets

MOBILE TERMINAL

Pursuant to 35 U.S.C. §119(a), this application claims the benefit of earlier filing date and right of priority to Korean Application No. 10-2011-0113829, filed on Nov. 3, 2011, the contents of which are hereby incorporated by reference herein in their entirety.

BACKGROUND OF THE DISCLOSURE

1. Field of the Disclosure

The present invention relates to a mobile terminal. Although the present invention is suitable for a wide scope of application, the present invention relates to a mobile terminal including a user input unit having a backlight provided therein.

2. Discussion of the Related Art

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

There are ongoing efforts to support and increase the functionality of mobile terminals. Such efforts include software and hardware improvements, as well as changes and improvements in the structural components which form the mobile terminal.

Accordingly, there may be improvement of a user input unit, specifically, a backlight provided in a touch type touch pad or pressure type key button. A conventional backlight has following disadvantages.

Different from a backlight provided in a display, such a user input unit in a mobile terminal has an internal space limitation. Accordingly, it is difficult to use a member for diffusing a light of a light source such as an optical film for vertical direction light concentration, for example, double BEF (DBEF) or a brightness enhancement film (BEF) rather than a light guide film and a diffuser in the user input unit.

As a result, the light of the light source guided to the user input unit is not diffused sufficiently and the backlight cannot be provided to the user input unit uniformly.

SUMMARY OF THE DISCLOSURE

Accordingly, the present invention is directed to a mobile terminal that substantially obviates one or more problems due to limitations and disadvantages of the related art.

An object of the present invention is to provide a mobile terminal that is able to uniformly diffuse a light of a light source for providing a backlight to a user input unit provided therein.

Another object of the present invention is to provide a mobile terminal that is able to prevent a hot spot and a dark area generated in the backlight provided to the user input unit and to improve uniformity of the backlight.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a mobile terminal includes a mobile terminal includes a mobile terminal includes a case; a touch key mounted in a predetermined portion of the case to generate touch type input data; a light source arranged on a back side of the touch key to emit light; and a light diffusion unit configured to diffuse the light of the light source to provide a backlight to the touch key uniformly, wherein the light diffusion unit includes a light guide part configured to covert the light provided from the light source into a surface light source; an air gap arranged on the light guide part to initially diffuse the light provided from the light guide part, the air gap formed via the case to correspond to the touch key; and a diffuser arranged on the air gap to secondarily diffuse the light provided from the air gap.

The light of the light source may be provided to the light guide part from a lateral direction or a back side direction with respect to the light guide part.

The light diffusion unit may further include a reflection film arranged under the light guide part to reflect the light of the light source toward the air gap.

The light guide part and the diffuser may be attached to the case by an optical transparent down-sided tape.

The optical transparent double-sided tape may include a light transmitting hole formed there from, corresponding to the air gap.

The touch type may be a capacitive touch type.

The light source may be a light emitting diode (LED).

In another aspect of the present invention, a mobile terminal includes a case; a key button mounted in a predetermined portion of the case; a light source configured to provide a backlight to the key button; a dome switch pressed by the key button; and a light diffusion unit configured to diffuse the light of the light source to provide the backlight to the key button uniformly, wherein the light diffusion unit includes a light guide part arranged on the dome switch to convert the light provided from the light source into a surface light source; an air gap formed between the light guide part and a back surface of the case to initially diffuse the light of the light source provided from the light guide part; and a diffuser arranged on the air gap to secondarily diffuse the light of the light source provided from the air gap.

The light of the light source may be provided to the light guide part from a lateral direction of the light guide part.

The light diffusion unit may further include a reflection film attached to a back surface of the light guide part to reflect to the light of the light source toward the air gap.

The mobile terminal may further include a rubber pad attached to the back surface of the case to support the key button, the rubber pad comprising one or more pressing protrusions projected there from to press the dome switch.

The rubber pad may be formed of a transparent or opaque material to pass the light of the light source there through.

The key button may have arrangement of a QWERTY keyboard.

The present invention has following effects.

The mobile terminal according to at least one embodiment of the present invention may diffuse the light of the light source two times by using the air gap and the diffuser. Accordingly, the mobile terminal may uniformly diffuse the light of the light source capable of providing the backlight.

Furthermore, the mobile terminal according to at least one embodiment of the present invention may prevent a hot spot or a dark area from being generated in the backlight provided to the user input unit. Accordingly, the mobile terminal may enhance the uniformity of the backlight.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying drawing figures which form a part hereof, and which show by way of illustration specific embodiments of the invention. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Figure 1:
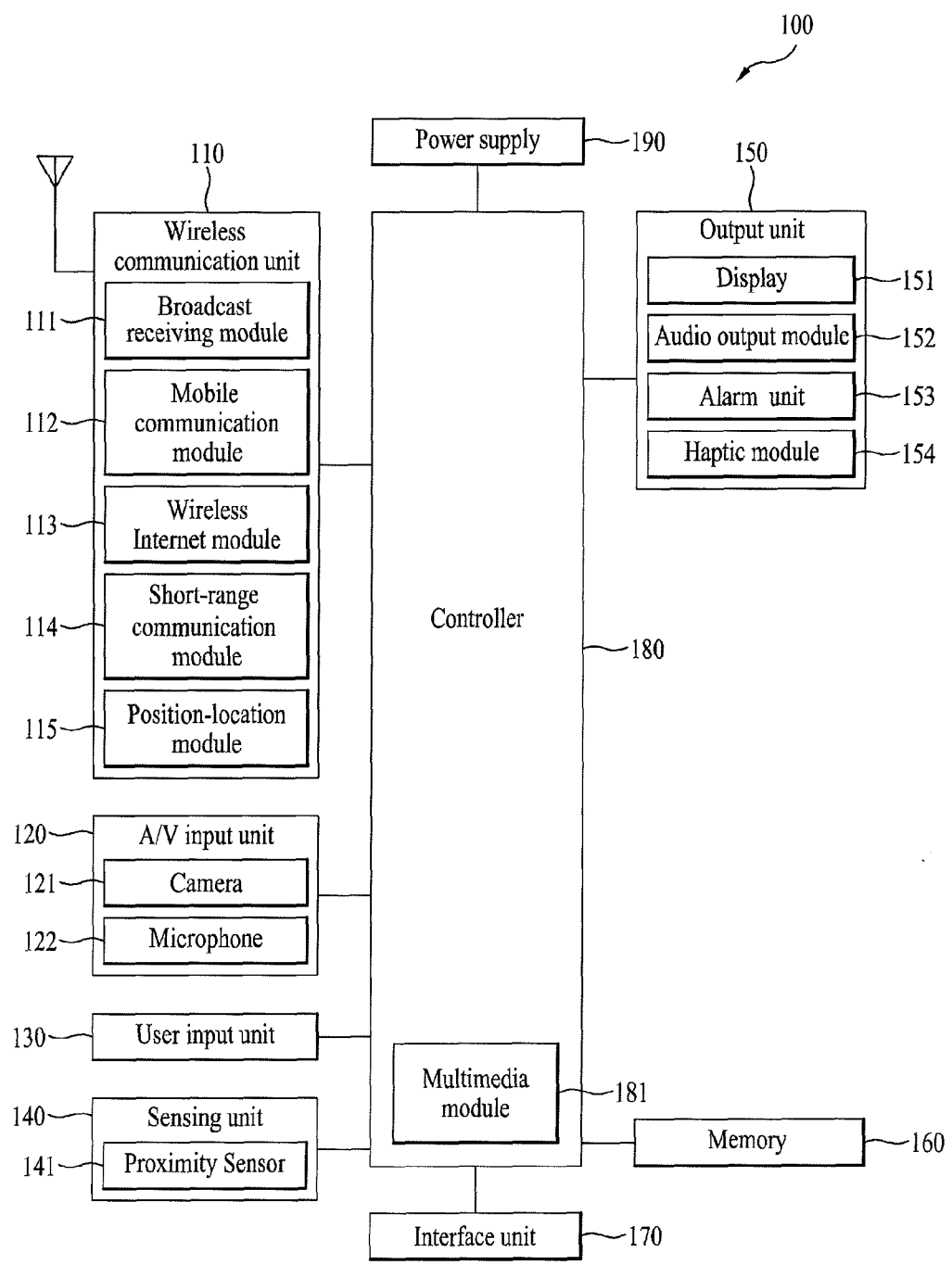
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 132 provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
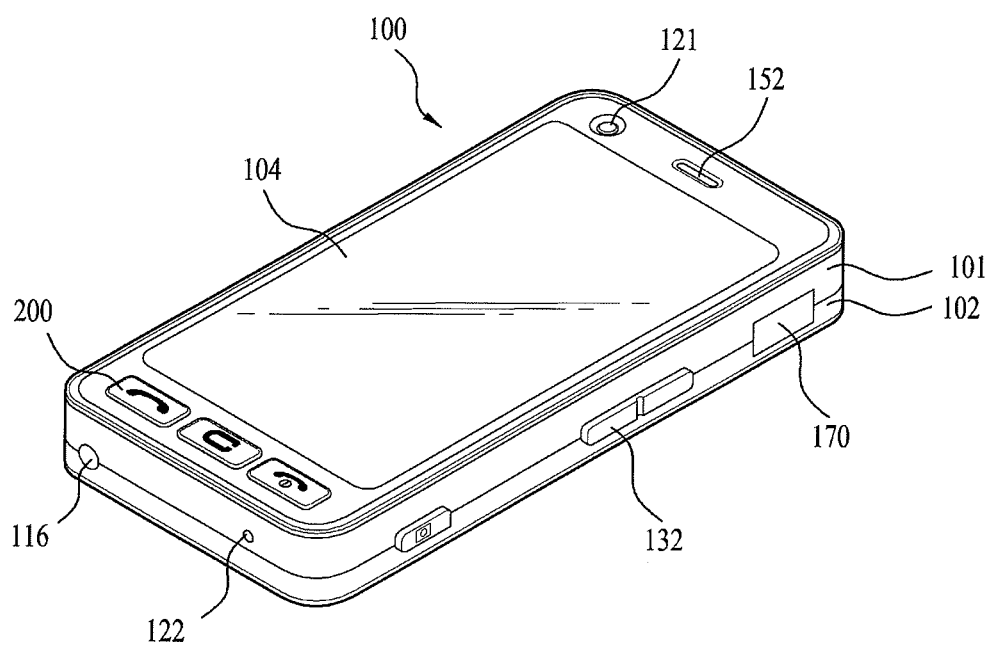
FIG. 2 is a front perspective view of the mobile terminal according to one embodiment of the present invention.

Referring to FIGS. 1 and 2, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101, 102, 103 configuring an exterior thereof. In the present embodiment, the case can be divided into a front case 101 and a rear case 102. Various electric/electronic parts are loaded in a space provided between the front and rear cases 101 and 102. At least one intermediate case may be further arranged between the front case 101 and the rear case 102.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units 130/200 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 200 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 200 and 132. The manipulating units 200 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 200. In addition, a command for a volume adjustment of sound output from the audio output unit 152 and the like can be input to the second manipulating unit 132, a command for a switching to a touch recognizing mode of the display 151 and the like can be input to the second manipulating unit 133.

The user input unit 130 may consist of a touch key 200 using a touch sensor and a button 132 using a dome switch, according to an input manner.

Figure 3:
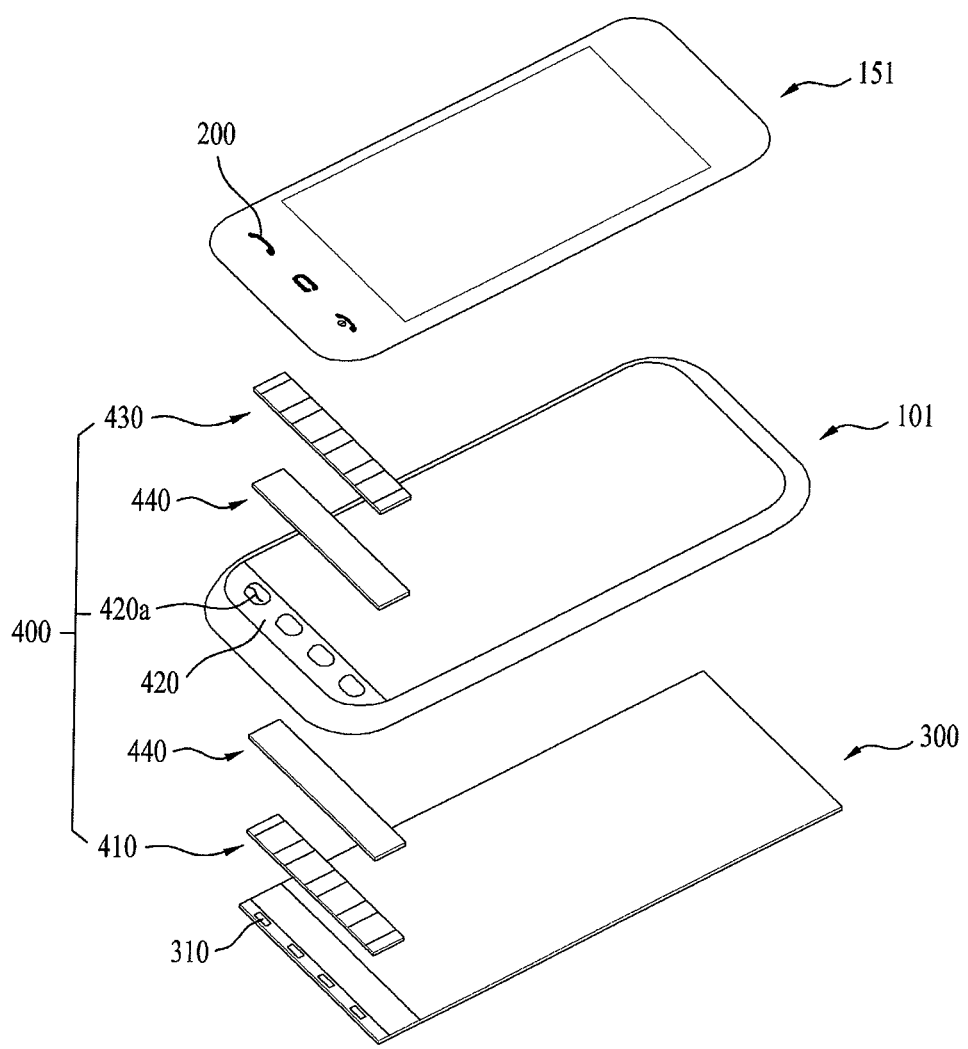
FIG. 3 is a cut-away perspective view of the mobile terminal according to one embodiment of the present invention.
Figure 4:
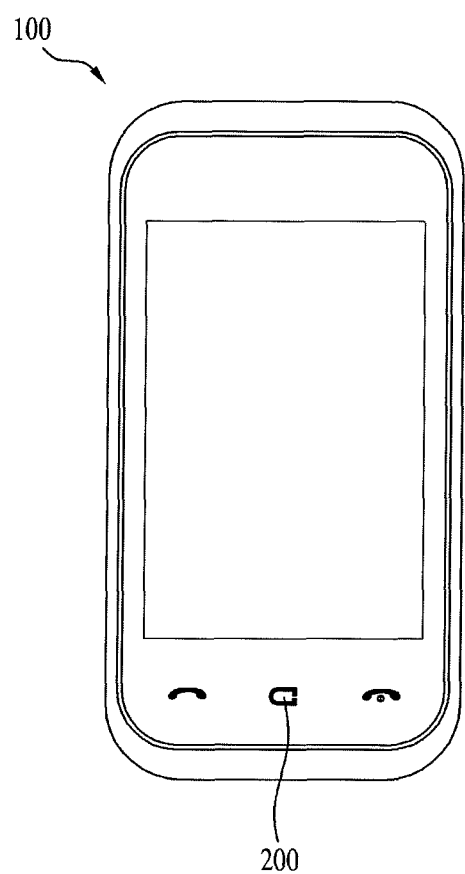
FIG. 4 is a front view of the mobile terminal according to one embodiment of the present invention.
Figure 5:
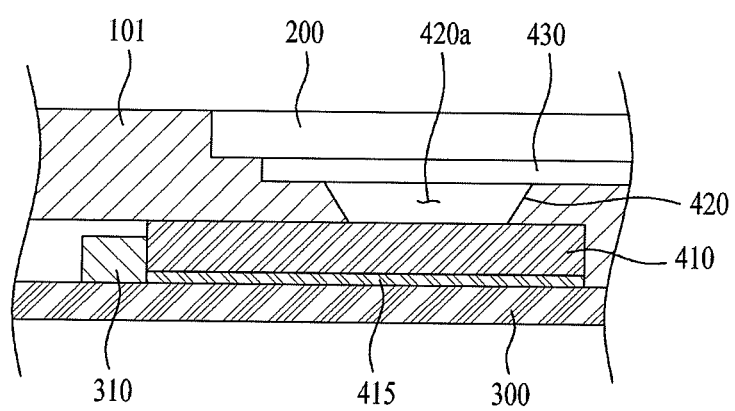
FIG. 5 is a sectional view of the mobile terminal according to one embodiment of the present invention.

FIG. 3 is a cut-away perspective view of the mobile terminal according to one embodiment of the present invention. FIG. 4 is a front view of the mobile terminal according to one embodiment of the present invention. FIG. 5 is a sectional view of the mobile terminal according to one embodiment of the present invention.

The mobile terminal according to one embodiment of the present invention may include a case, a touch key mounted in a predetermined portion of the case to generate input data according to a touch manner, a light source configured to provide a backlight to the touch key, and a light diffusion unit configured to diffuse the light of the light source to provide the touch key with backlights uniformly. The light diffusion unit may include a light guide unit configured to convert the light provided by the light source into a surface light source, an air gap arranged on the light guide unit, passing through the case to correspond to the touch key, to diffuse the light of the light source provided from the light guide unit initially, and a diffuser arranged on the air gap to diffuse the light of the light source provided from the air gap secondarily.

The cases 101 and 102 may define an exterior appearance of the mobile terminal body mentioned above and various electronic parts may be mounted in a space formed in the cases.

The bar type mobile terminal may include the front case 101 and the rear case 102 as mentioned above. For explanation sake, it will be embodied as one of examples that a touch key 200 and a key button 500, which will be described later, are provided in the front case 101.

The touch key 200 is mounted in the predetermined portion of the case 101 and it includes the user input unit 130 generating input data according to the touch type.

As shown in FIG. 3, the touch key 200 may be integrally formed with the display 151 on a front surface of the front case 101. In this instance, the display 151 may implement the function of the user input unit 130 rather than the function of outputting image information.

Of course, the touch key 200 and the display 151 may be provided independently. However, it is embodied that the touch key 200 and the display 151 are integrally formed with each other for explanation sake.

Moreover, the touch key 200 includes a touch sensor provided therein and it detects change generated in a specific spot. After that, the touch key 200 converts the change into an electrical signal and transmits the converted electrical signal into the controller. Here, the touch sensor can detect various changes. For example, a touch sensor that can detect change in the electrostatic capacity generated in a specific spot of the touch key 200.

As shown in FIG. 3, parts of the touch key 200 may be spaced apart a predetermined distance from each other. The touch key 200 may be configured of an input part for 'Send', an input part for 'End' and a plurality of parts for performing unique functions, respectively. Such a plurality of input parts may include input parts for 'Back' and 'Home'.

The light source 310 provides the backlight to the touch key 200. For example, the light source 310 is mounted on a top surface of the substrate 300 where various electronic parts can be arranged. Corresponding to the size and number of the input parts, one or more light sources may be arranged.

If backlights are provided to a plurality of input parts provided in the touch key 200 by using one light source 310, brightness of the backlight provided to each of the input parts and the usage of the electricity and the cost of installing the light source is reduced such that one light source may be economical.

Moreover, the light source 310 may be mounted at various positions in the mobile terminal 200, rather than on the top surface of the substrate 300. For explanation sake, the same number of the light sources may be arranged on the top surface of the substrate 300 as the number of the input parts.

As the light source 310, various light emitting devices can be used, for example, a light emitting diode (LED). The light source 310 may irradiate a light in various directions to provide the backlight to the touch key 200, which will be described later together with the light guide unit.

Meanwhile, the mobile terminal is a device having a small volume in which various electronic parts are highly integrated. Accordingly, there has to be a small room and the light source 310 and the touch key 200 have to be substantially close to each other in such a small room.

Because of the installed cost and depth of the backlight provided to the touch key 200, it is difficult to configurate the backlight having a multi-layered structure which can be used in the display.

In this instance, there may be a hot spot where the backlights are concentrated in a specific spot of the input parts or a dark area where the backlights failed to be provided, only to deteriorate the uniformity of the backlights which is the reason of a deteriorated image quality of the mobile terminal.

To solve that disadvantage, the mobile terminal 100 according to one embodiment of the present invention may include a light diffusion unit 400 configured to provide backlights to the touch key 200 uniformly. The light diffusion unit 400 may include a light guide part 410, an air path 420 and a diffuser 430.

The light guide part 410 converts (e.g., changes, transforms, guides, etc.) the light provided from the light source 310 into surface-light. As shown in FIG. 5, the light guide part 410 may be arranged on the substrate 300. As the light guide part 410, a light guide plate (LGP) or a light guide film (LGF) that is thinner than the light guide plate.

A reflective layer or a dotted pattern may be formed in a back surface of the light guide part 410 to diffuse light incident from a predetermined portion of the light guide part 410 toward a direction of a front surface uniformly, only to inject the light incident in a back surface direction toward a front surface direction. In addition, a triangle-shaped prism pattern may be formed in the back surface to make light diffused in the front surface direction.

The light guide part 410 can adjust a refraction angle according to a plurality of light guide patterns formed therein. As shown in FIG. 5, the light guide part 410 may guides the light of the light source 310 incident thereon into surface-light sources. For that, the light guide part 410 may be a plastic molded lens having a light refracting property.

Meanwhile, as shown in FIG. 5, the light source 310 mentioned above may be arranged in a lateral direction with respect to the light guide part 410. In this instance, the light of the light source 310 may be incident in the lateral surface direction of the light guide part 410 and emitted in the front surface direction.

When the light source 310 is arranged in the lateral surface direction of the light guide part 410, the length of the light in which the light can travel while refracted in the light guide part 410 may be relatively larger than the length of the light when the light source 310 is arranged in a vertically low direction of the light guide part 410. Accordingly, the light of the light source 310 can be converted into the surface light sources uniformly. In other words, the hot spot may be prevented from being formed in the center of the touch key 200.

An air gap 420a of the air path 420 may be formed via the case 101, corresponding to the touch key 200, and it may be arranged on the light guide part 410 to initially diffuse the light of the light source 310 provided from the optical film.

More specifically, as shown in FIG. 3, one or more air paths 420 may be formed via the front case 101 to correspond to the touch key 200 and the air gap 420a may be formed in the air path 420 to diffuse the light passing there through.

The air gap 420a having the corresponding height to the depth of the front case 101 is formed and the light of the light source provided to the input part of the touch key 200 may be diffused. Meanwhile, for explanation sake, the diffusion performed by the air gap 420a will be described in detail together with the light guide part 410 and the diffuser 430.

The diffuser 430 may be arranged on the air gap 420a to diffuse the light of the light source 310 provided from the air gap 420a (e.g., to further or additional diffuse the light), and it may be fabricated of various materials having a property of refracting and diffusing lights.

For example, as shown in FIG. 5, the diffuser 420 may be arranged between the top surface of the front case 101 and the touch key 200, specifically, on the top surface of the front case 101 to cover an entrance of the air path 420.

Accordingly, the diffuser 430 is provided with the light of the light source 310 having passed the air gap 420a to diffuse the light secondarily, only to provide the backlight to the input part of the touch key 200.

Hence, the process of providing the backlight to the input part of the touch key 200 via the light guide part 410, the air gap 420a and the diffuser 430 will be described in detail.

First of all, the light of the light source 310 incident in the lateral surface direction of the light guide part 410 is refracted toward the air gap 420a as shown in FIG. 5 to be guided to the air gap 420a.

After that, the light of the light source 310 guided to the air gap 420a is diffused initially while passing the air gap 420a as shown in FIG. 5 and the diffused light is guided to the diffuser 430.

Hence, the light of the light source 310 guided to the diffuser 430 is additionally diffused while passing the diffuser 430 as shown in FIG. 5. The light of the light source 310 having passed the diffuser 430 may provide the light to each of the input parts provided in the touch key 200.

In the mobile terminal 100 according to one embodiment of the present invention, the air gap 420a is formed between the light guide part 410 and the diffuser 430, without multi-layering them closely. Accordingly, a phenomenon of Air Haze in which light is dispersed when passing the air gap can enhance the index of refraction and the light of the light source 310 can be diffused to be uniformly incident on the diffuser 430.

If a medium is changed, the index of refraction is differentiated and the differentiated refractive index can bend a path of light. If the light path is changed while the light is reflected or passing another medium, the light dispersion effect can be enhanced to disperse the light uniformly. In other words, uniformity is enhanced and the air gap 420a formed between the light guide part 410 and the diffuser 430 may enhance the uniformity.

Figure 11:
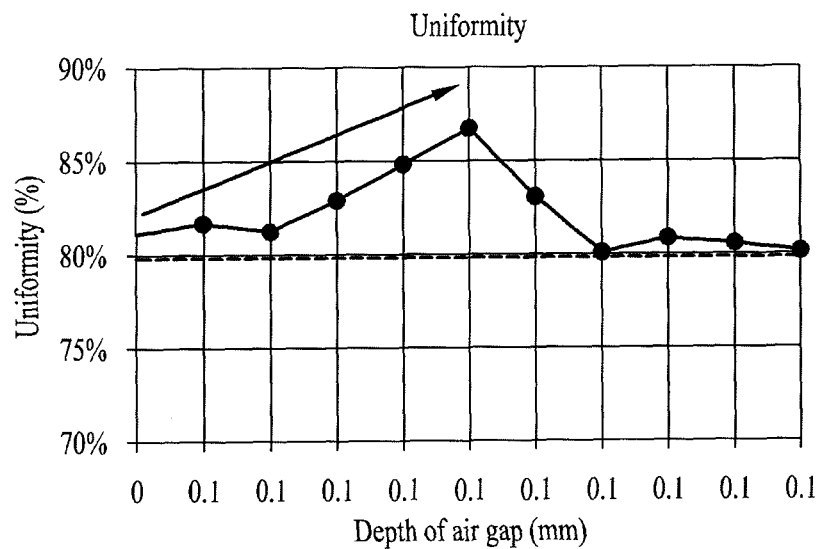
FIG. 11 is a graph showing change of uniformity according to the depth of the air gap.

FIG. 11 is a graph showing change of uniformity according to the depth of the air gap 420a. The light dispersion effect is not necessarily improved when the depth of the air gap 420a is large. Referring to FIG. 11, the depth of the air gap 420a is getting larger, the uniformity is increased. The uniformity is maximized when the depth of the air gap 420a is approximately 0.5 mm.

Figure 13:
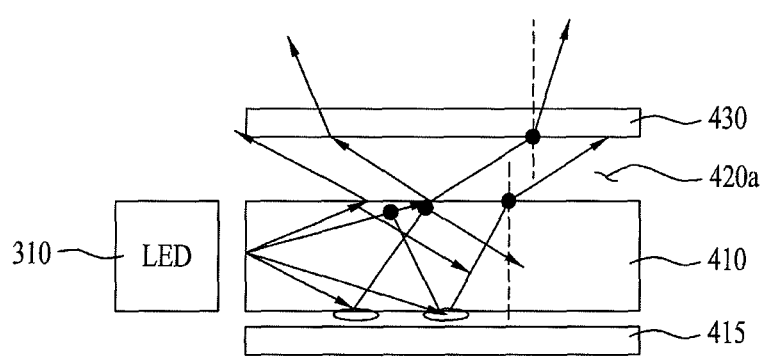
FIG. 13 is a conceptual diagram of the light path through the light diffusion unit according to the embodiment of the present invention.

As shown in FIG. 13, the refractive index of the air gap 420a is larger than that of the light guide part 410. The light path is bent in the lateral direction as the light is incident on the air gap 420a. There may be the light dispersion effect until the depth of the air gap 420a reaches a predetermined value. However, if the depth of the air gap is too large, all of the light is dispersed outside and the uniformity is even decreased.

Figure 12:
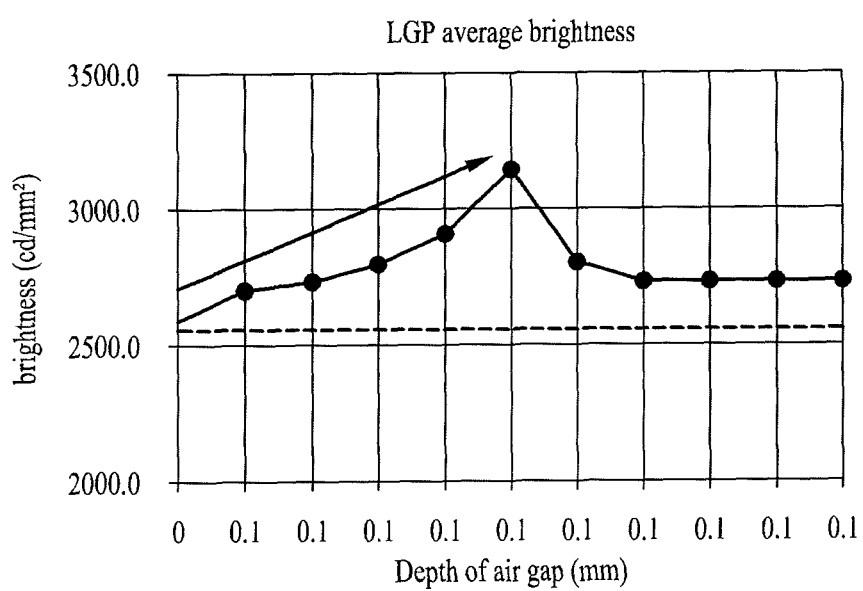
FIG. 12 is a graph showing change of brightness according to the depth of the air gap.

Meanwhile, FIG. 12 is a graph showing change of brightness according to the depth of the air gap 420a. As the air gap 420a is getting thicker, the brightness may be getting increased up to a predetermined value.

That is because the light dispersed in the air gap is collected by the differentiated refractive index while the light are passing the diffuser 430. In other words, the more light injected forwardly in the front surface direction are collected, the brightness is getting higher. The light incident on the diffuser 430 from the air gap 420a is refracted in the front surface direction and the brightness is heightened.

If the depth of the air gap 420a is too larger, the light is diffused outward too much only to heighten the brightness of a specific spot and the brightness is deteriorated entirely. Even in this instance, the brightness of the air gap 420a is the highest when the depth of the air gap 420a is approximately 0.5 mm and it is decreased when the depth of the air gap 420a passes 0.5 mm.

The optimal depth of the air gap 420a (approximately, 0.5 mm) is calculated when the light guide part 410 having the depth of 1.5 mm is used. The optimal depth of the air gap 420a may be differentiated according to the depth of the light guide part 410, the dotted pattern or prism pattern formed in the light guide part 410 or the material used in making the light guide part 410.

As a result, the input part may be free from the hot spot and the dark area. Also, the uniformity of the backlight provided to the input part can be enhanced and the esthetic sensitivity of the mobile terminal 100 can be enhanced.

Meanwhile, the light diffusion unit 400 may further include a reflection film 415 arranged under the light guide film to reflect the light of the light source 310 toward the air gap 420a.

As shown in FIG. 3, the reflection film 415 may be bonded to a top surface of the substrate 300. The reflection film 415 can reflect the light of the light source toward the air gap 420a. Optionally, the reflection film 415 may be bonded to a back surface of the light guide part 420, without being bonded to the top surface of the substrate 300.

Moreover, the reflection film 415 may be formed of various materials having a property of reflecting lights. The reflection film 415 may include a reflection pattern having a specific pattern therein to reflect the light of the light source 310 toward the air gap 420a at a predetermined angle.

Meanwhile, the light guide part 410 and the diffuser 420 may be attached to the case 101 by an optical transparent double-sided tape (OCA).

As shown in FIG. 5, the light guide part 410 is attached to a back surface of the front case 101 and the diffuser 430 is attached to a top surface of the front case 101. For that, the light guide part 410 and the diffuser 430 are attached to the front case 101 by the optical transparent double-sided tape 440 having a light transmitting property.

When the optical transparent double-sided tape 440 covers a top surface or back surface of the air gap 420a, the refractive index of the light might be changed by the optical transparent double-sided tape 440. To prevent that, one or more light-transmitting hole may be formed in the optical transparent double-sided tape 440, corresponding to the air gap 420a.

A mobile terminal according to another embodiment of the present invention may include a case, a key button mounted in a predetermined portion of the case, a light source configured to provide a backlight to the key button, a dome switch pressed by the key button, and a light diffusion unit configured to diffuse the light of the light source to uniformly provide the backlight to the key button. The light diffusion unit may include a light guide part arranged on the dome switch to covert the light provided from the light source into a surface light, an air gap formed between the light guide part and a back surface of the case to initially diffuse the light of the light source provided from the light guide part, and a diffuser arranged on the air gap to secondarily diffuse the light of the light source provided from the air gap.

Descriptions of the components identical to the case 101, the light source 310 and the light guide part 410 composing the mobile terminal according to the embodiment described above will be omitted or described simply as follows. Differences between the embodiments will be described in detail.

A key button 500 is mounted in a predetermined portion of the case 101 and the key button 500 performs a function of a module composing the user input unit 130 configured to generate input data input by the user to control the operation of the mobile terminal 100.

Figure 6:
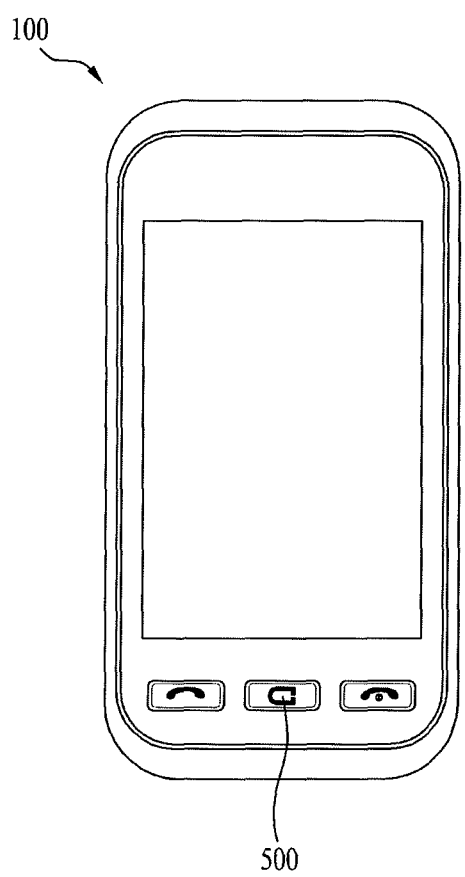
FIG. 6 is a front view of a mobile terminal according to another embodiment of the present invention.

As shown in FIG. 6, the key button 500 is mounted in a predetermined portion of a front case 101. The mobile terminal 100 may include one or more buttons 500 configured to provide the user with a user interface (UI).

Figure 7:
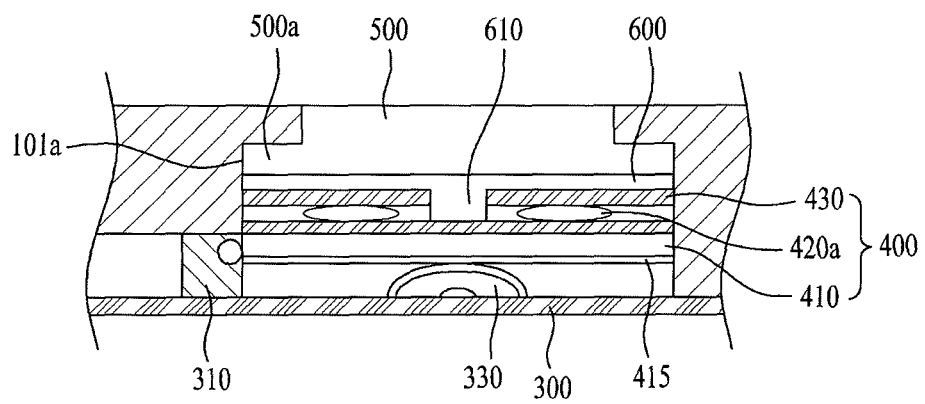
FIG. 7 is a sectional view of the mobile terminal according to the embodiment of FIG. 6.

As shown in FIG. 7, the front case 101 may include a key button inserting hole 101a formed via a front surface thereof. The key button 500 may have a flange 500a horizontally extended along an outer circumferential surface of a back surface thereof. Accordingly, the key button 500 is fixedly inserted in the key button inserting hole 101a to make the flange 500a locked to the key button inserting hole 101a.

Figure 8:
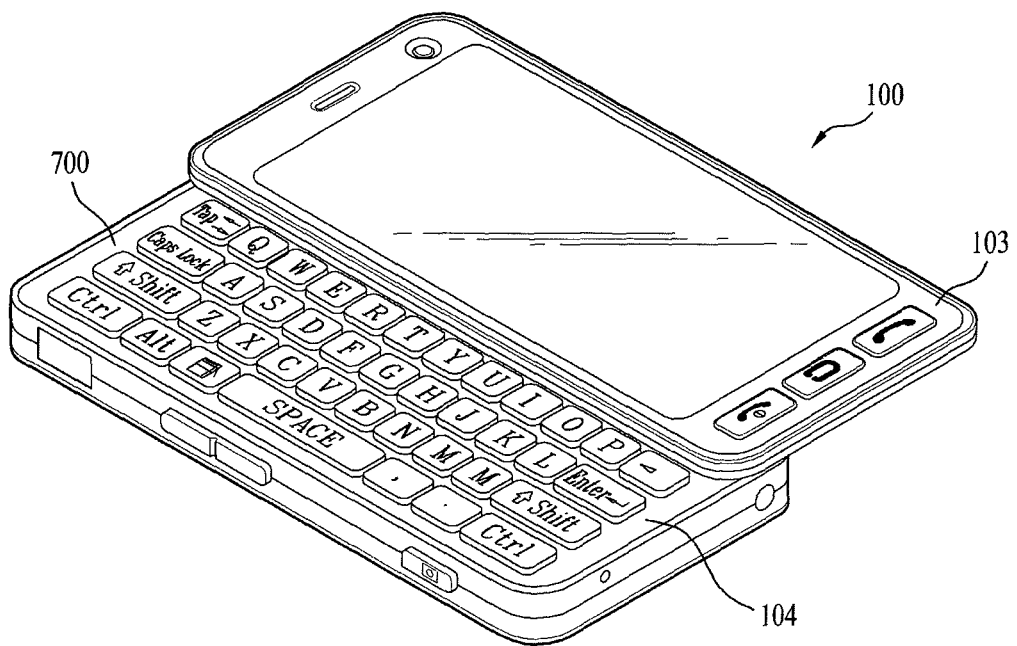
FIG. 8 is a perspective view of the mobile terminal according to the embodiment of the present invention.
Figure 9:
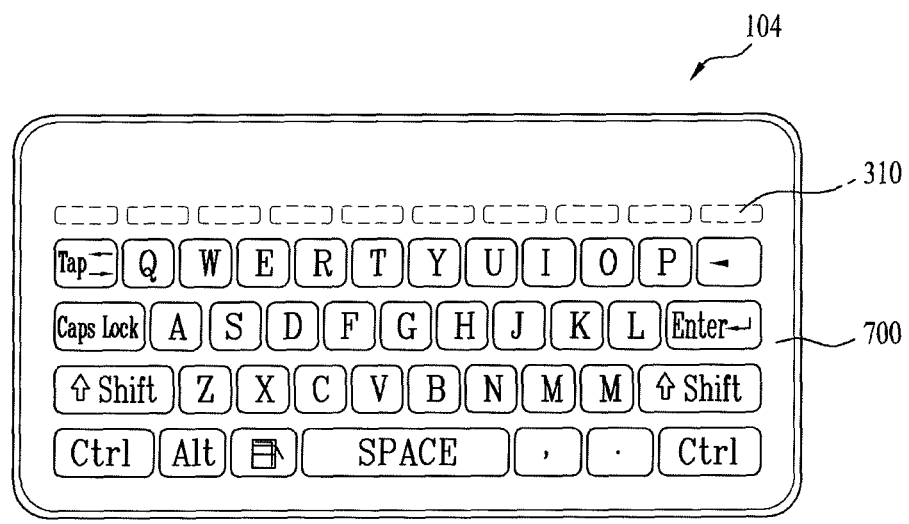
FIG. 9 is a front view of a QWERTY keyboard composing the mobile terminal according to the embodiment; of the present invention.

Meanwhile, as shown in FIG. 8, the key button 500 may be configured of a QWERTY keyboard 700. For example, the mobile terminal 100 is divided into a front part 103 having a display 151 mounted therein and a rear part 104 having the QWERTY keyboard 700 mounted therein. The front part 103 and the rear part 104 are sliding with respect to each other.

The light source 310 may provide the backlight to the key button 500. For example, the light source 310 may be mounted on a top surface of the substrate 300 as shown in FIG. 7 and the present invention is not limited thereto. The light source 310 may be arranged in various positions according to the structure of the mobile terminal.

Meanwhile, one or more light sources 310 may be provided according to the arrangement or size of the key button 500. For example, when the key button 500 is configured of the QWERTY keyboard 700, one light source 310 is used in providing backlight to a plurality of key buttons 500.

The dome switch 330 is pressed by the key button 500, in other words, each of the key buttons 500 to transmit an input signal to the controller 180. As shown in FIG. 7, one or more dome switches 330 corresponding to the key buttons 500, respectively, may be mounted on the top surface of the substrate 300.

Meanwhile, the backlight might fail to be provided to the key buttons 500 uniformly in the mobile terminal according to this embodiment of the present invention. Actions have to be taken to diffuse the light of the light source 310 uniformly.

To solve that failure, the mobile terminal according to this embodiment may further include a light diffusion unit 400 to diffuse the light of the light source 300 to provide the backlight to the key buttons 500 uniformly. The light diffusion unit 400 may include a light guide part 410, an air gap 420a and a diffuser 430.

The light guide part 410 may be arranged on the dome switch 330 as shown in FIG. 7 and it may be employed to covert light provided to the light source 310 into surface light sources.

When the key buttons 500 are pressed, the light guide part 410 is converted downwardly and it may be formed of an elastic material to prevent damage to the light guide part 410.

Figure 10:
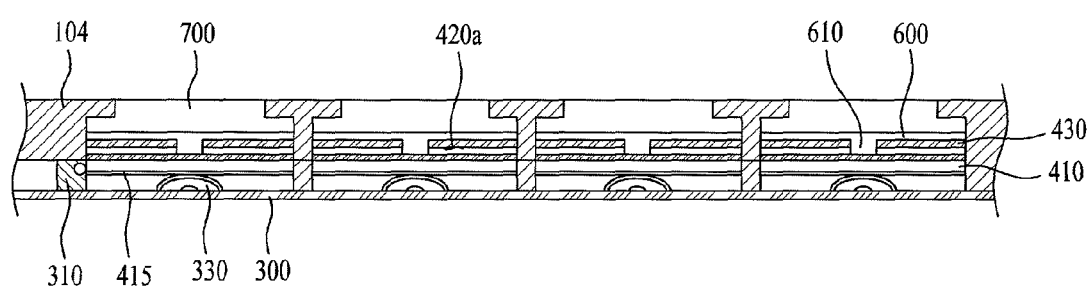
FIG. 10 is a sectional view of the QWERTY keyboard according to the embodiment of the present invention.

Meanwhile, as shown in FIGS. 7 to 10, the light source 310 may be arranged in a lateral surface of the light guide part 410 to provide the light of the light source 310 to the light guide part 410 from a lateral surface direction of the light guide part 410 as shown in FIGS. 7 and 10. Accordingly, the light of the light source 310 may be converted into surface light sources uniformly.

The air gap 420a may be formed between the light guide part 410 and a back surface of the case 101 and it may initially diffuse the light of the light source 310 provided from the light guide part 410.

As shown in FIG. 7, the light guide part 410 is spaced apart a predetermined distance from the back surface of the front case 101. Accordingly, the light of the light source 310 converted into the surface light sources by the light guide part 410 may be incident on the air gap 420a formed between the light guide part 410 and the back surface of the front case 101 via a top surface of the light guide part 410. The light incident on the air gap 420a may be initially diffused by the air gap 420a.

The diffuser 430 may be arranged on the air gap 420a and it may secondarily diffuse the light of the light source 310 provided from the air gap 420a.

The characteristic that the uniformity and brightness of the light is enhanced while the light passing through the light guide part 410, the air gap 420a and the diffuser 430 is identical to the characteristic described above in the mobile terminal according to the former embodiment.

As shown in FIG. 7, the diffuser 430 may be arranged on the air gap 420a, specifically, between a top portion of the light guide part 410 and the back surface of the front case 101. The diffuser 430 may secondarily diffuse the light having passed the air gap 420a and provide the diffused light to the key buttons 500.

Moreover, a through hole may be formed in the diffuser 430 and a pressing protrusion 610 formed in a rubber pad 600 attached to the diffuser, which will be described later, may be inserted in the through hole (not shown).

The diffuser 430 is converted downwardly when the key buttons 500 are pressed, like the light guide part 410. Accordingly, the diffuser 430 may be formed of an elastic material to prevent damage thereto.

Meanwhile, as shown in FIG. 7, the light diffusion unit 400 may further include a reflection film 415 attached to a back surface of the light guide part 410 to reflect the light of the light source 310 toward the air gap 420a.

The reflection film 415 may reflect light incident on the back surface of the light guide part 410 after failing to be provided to the air gap 420a toward the air gap 420 again.

Meanwhile, the mobile terminal 100 may further include a rubber pad 600 attached to a back surface of the case 110 to support the key buttons 500. The rubber pad 600 may include one or more pressing protrusions 610 projected there from.

As shown in FIG. 7, the rubber pad 600 is attached to the back surface of the front case 101 to support the key buttons 500 from being separated from the back surface of the front case 101.

Moreover, the rubber pad 600 may be formed of an elastic material to prevent pressing of another dome switch 330 adjacent to one dome switch 330 corresponding to a specific key button, not pressing one dome switch. Optionally, the rubber pad 600 may be formed of a transparent or opaque material the light of the light source 310 can transmit there through.

As shown in FIG. 7, predetermined portions of the back surface of the rubber pad 600 are projected to form the pressing protrusion 610, corresponding to the key buttons 500. When each of the key buttons 500 is pressed, each of the pressing protrusions presses the corresponding dome switch 330 to generate an input signal.

Meanwhile, when the rubber pad 600 is attached to the back surface of the front case 101, the diffuser 430 may be attached to a back surface of the rubber pad 600. In this instance, the pressing protrusions 610 are inserted in the through holes of the diffuser 430. FIG. 10 illustrates details of the keyboard 700.

Next, the process of providing the backlight to the key buttons 500 via the light guide part 410, the air gap 420a and the diffuser 430 will be described in detail as follows.

First of all, the light of the light source 310 incident from the lateral surface direction of the light guide part 410 are refracted toward the diffuser 430 as shown in FIG. 7.

After that, the light transmitted via the light guide part 410 is initially diffused while passing the air gap 420*a* provided between the light guide part 410 and the diffuser 430.

In other words, the light guide part 410 and the diffuser 430 are spaced apart a predetermined distance from each other, not layered face-to-face. The light of the light source 310 are uniformly diffused by the air gap 420*a* provided between the light guide part 410 and the diffuser 430, before guided to the diffuser 430.

Moreover, the light of the light source 310 guided to the diffuser 430 are secondarily diffused by the diffuser 430, to provide backlight to the key buttons 500.

Even when providing the backlight to the key buttons 500, the light of the light are diffused by the air gap 420*a* and the diffuser 430 two times in the mobile terminal 100 according to this embodiment.

As a result, the hot spot or the dark area generated in the key buttons 500 can be prevented and the uniformity of the backlight provided to the key buttons 500 can be enhanced. Also, the esthetic sense of the mobile terminal 100 can be enhanced.

Various variations and modifications are possible in the component parts and/or arrangements of the subject combination arrangement within the scope of the disclosure, the drawings and the appended claims. Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A mobile terminal comprising:
   a case;
   a touch key plate mounted in a predetermined portion of the case and configured to generate touch type input data, the touch key plate including a touch key to receive a touch input and a portion surrounding the touch key;
   a light source arranged on a back side of the touch key and configured to emit light; and
   a light diffusion unit configured to diffuse the light emitted from the light source and provide a backlight to the touch key,
   wherein the light diffusion unit includes:
      a light guide part configured to guide the light emitted by the light source; and
      a diffuser arranged on the light guide part and configured to diffuse the light provided from the light guide part towards the touch key,
   wherein the case is arranged between the light guide part and the diffuser and includes:
      an opening formed corresponding to the touch key to form an air gap to diffuse the light from the light guide part,
         wherein a cross sectional area of the opening increases in a direction from the light guide part to the diffuser, and
      a body formed corresponding to at least part of the surrounding portion of the touch key plate.

2. The mobile terminal according to claim 1, wherein the light source is provided to a lateral side or back side of the light guide part.

3. The mobile terminal according to claim 1, wherein the light diffusion unit further includes:
   a reflection film arranged under the light guide part and configured to reflect the light emitted by the light source toward the air gap.

4. The mobile terminal according to claim 1, further comprising:
   an optical transparent double-sided adhesive tape configured to attach the light guide part and the diffuser to the case.

5. The mobile terminal according to claim 4, wherein the optical transparent double-sided adhesive tape includes a light transmitting hole at a location corresponding to the air gap.

6. The mobile terminal according to claim 1, wherein the touch type input data is generated via a capacitive touch or a pressure sensitive touch.

7. The mobile terminal according to claim 1, wherein the light source is a light emitting diode (LED).

8. The mobile terminal according to claim 1, wherein the light guide part is a light guide plate or a light guide film.

9. The mobile terminal according to claim 1, wherein the diffuser is attached to a back surface of the touch key, and
   a top surface of the light guide part is in contact with a bottom surface of the body of the case, and a bottom surface of the diffuser is in contact with a top surface of the body of the case.

10. The mobile terminal according to claim 1, wherein a depth of the air gap is determined according to a depth of the light guide part, a dotted pattern or prism pattern formed in the light guide part or a material used in making the light guide part.

11. The mobile terminal according to claim 10, wherein the depth of the air gap is 0.4 mm or more and 0.6 mm or less.

12. A mobile terminal comprising:
   a case;
   a key plate mounted in a predetermined portion of the case, the key plate including a key button to receive an input and a portion surrounding the key button;
   a light source configured to emit light;
   a dome switch configured to be pressed by the key button; and
   a light diffusion unit configured to diffuse the light emitted by the light source and provide a backlight to the key button,
   wherein the light diffusion unit includes:
      a light guide part arranged on the dome switch and configured to guide the light emitted by the light source; and
      a diffuser arranged on the light guide part and configured to diffuse the light provided from the light guide part towards the key button,
   wherein the case is arranged between the light guide part and the diffuser and includes:
      an opening formed corresponding to the key button to form an air gap to diffuse the light from the light guide part,
         wherein a cross sectional area of the opening increases in a direction from the light guide part to the diffuser, and
      a body formed corresponding to at least part of the surrounding portion of the key plate.

13. The mobile terminal according to claim 12, wherein the light source is provided to a lateral side of the light guide part.

14. The mobile terminal according to claim 12, wherein the light diffusion unit further includes:
   a reflection film attached to a back surface of the light guide part and configured to reflect the light emitted by the light source toward the air gap.

15. The mobile terminal according to claim 12, further comprising:
   a rubber pad attached to a back side of the case and configured to support the key button, the rubber pad including one or more pressing protrusions projected therefrom to press the dome switch.

16. The mobile terminal according to claim 15, wherein the rubber pad includes a transparent or opaque material to pass the light of the light source.

17. The mobile terminal according to claim 15, wherein the key button has an arrangement of a QWERTY keyboard.

18. The mobile terminal according to claim 12, wherein the light guide part is a light guide plate or a light guide film.

19. The mobile terminal according to claim 12, wherein a top surface of the light guide part is in contact with a bottom surface of the body of the case, and a bottom surface of the diffuser is in contact with a top surface of the body of the case.

20. The mobile terminal according to claim 12, wherein a depth of the air gap is determined according to a depth of the light guide part, a dotted pattern or prism pattern formed in the light guide part or a material used in making the light guide part.

* * * * *